United States Patent [19]

Vlasblom

[11] Patent Number: 5,415,787

[45] Date of Patent: May 16, 1995

[54] LEATHER CLEANER AND CONDITIONER

[75] Inventor: Jack Vlasblom, Dunedin, Fla.

[73] Assignee: Citra Science Ltd., Largo, Fla.

[21] Appl. No.: 309,066

[22] Filed: Sep. 20, 1994

[51] Int. Cl.$^6$ .......................... C14C 11/00; B05D 7/12
[52] U.S. Cl. ................................. 252/8.57; 8/94.1 R; 8/94.1 P; 106/11; 106/285; 134/42; 427/384; 427/389
[58] Field of Search ...................... 252/8.57; 8/94.1 R, 8/94.1 P; 134/42; 427/384, 389; 106/11, 285

[56] References Cited

U.S. PATENT DOCUMENTS

| | | | |
|---|---|---|---|
| 2,283,540 | 5/1942 | Davis et al. | 252/8.57 |
| 3,656,881 | 4/1972 | Hemwall | 252/8.57 |
| 3,668,124 | 6/1972 | Cassella, Jr. | 252/8.57 |
| 4,158,543 | 6/1979 | Orlowski | 8/94.13 |
| 4,190,687 | 2/1980 | Sugiura et al. | 8/94.1 R |
| 4,285,688 | 8/1981 | Willis | 8/94.1 R |
| 4,554,083 | 11/1985 | Soldanski et al. | 252/8.57 |

FOREIGN PATENT DOCUMENTS 1-174600 7/1989 Japan.
4-218600 8/1992 Japan.

*Primary Examiner*—Anthony Green
*Attorney, Agent, or Firm*—Donald R. Fraser

[57] ABSTRACT

A leather cleaner and conditioner consists of d-limonene, diporpylene glycol N-butyl ether, lecithin, poly (5) oxyethylene isodecyl oxypropyl amine, sorbitan monolaurate, triethanolamine modified dodecylbenzene sulfonate, butylated hydroxytolune, mineral oil, and water.

4 Claims, No Drawings

LEATHER CLEANER AND CONDITIONER

FIELD OF INVENTION

This invention relates generally to a leather cleaner and conditioner. More particularly, the invention is directed to a formulation and method for using a leather cleaner and conditioner containing, inter alia, d-limonene, which formulation is non-irritating to the user and is additionally biodegradable.

BACKGROUND OF THE INVENTION

Many commercial products are currently available for cleaning and conditioning leather articles such as, for example, saddles and bridles, clothing items, furniture coverings, automobile interiors, fashion accessories such as belts and handbags, and the like. Generally, such products incorporate an oil-based soap which is manually applied and worked into the leather with a brush, and thereafter rinsed with water. These soaps tend to be quite irritating to the skin of the user, and moreover are not typically biodegradable. A more user and environmentally friendly leather cleaner and conditioner is needed.

It would be desirable to formulate a leather cleaner and conditioner which could be more easily applied to a leather article, would be non-toxic and non-irritating to the user, and which would be biodegradable.

SUMMARY OF THE INVENTION

Accordant with the present invention, a non-toxic, non-irritating, biodegradable leather cleaner and conditioner has surprisingly been discovered. It consists of d-limonene, dipropylene glycol N-butyl ether, lecithin, poly (5) oxyethylene isodecyl oxypropyl amine, sorbitan monolaurate, triethanolamine modified dodecylbenzene sulfonate, butylated hydroxytoluene, mineral oil, and water.

The present invention additionally contemplates a method for cleaning and conditioning leather utilizing the aforementioned formulation.

The leather cleaner and conditioner of the present invention is particularly useful for cleaning and conditioning leather saddles and bridles.

Further objects and advantages of this invention will be apparent from the following description and appended claims.

DETAILED DESCRIPTION OF THE PREFERRED EMBODIMENTS

The leather cleaner and conditioner according to the present invention consists of a precise combination of d-limonene, dipropylene glycol N-butyl ether, lecithin, poly (5) oxyethylene isodecyl oxypropyl amine, sorbitan monolaurate, triethanolamine modified dodecylbenzene sulfonate, butylated hydroxytoluene, mineral oil, and water.

D-limonene is a terpene which occurs naturally in all plants. It is a monocyclic unsaturated terpene which is generally a by-product of the citrus industry, derived from the distilled rind oils of oranges, grapefruits, lemons, and the like. A discussion concerning d-limonene and its derivation from numerous sources is set forth in Kesterson, J. W., "Florida Citrus Oil, " Institute of Food and Agricultural Sciences, University of Florida, December, 1971. D-limonene is commercially available from Florida Chemical Company and from SCM Glidco Organics. D-limonene may be present in the inventive formulation at a concentration from about 19 to about 60 weight percent. Preferably, the d-limonene concentration is about 27.8 weight percent.

Dipropylene glycol N-butyl ether is present in the inventive leather cleaner and conditioner. The concentration of dipropylene glycol N-butyl ether may range from about 7 to about 18 weight percent. Preferably, the concentration is about 13.5 weight percent.

Lecithin is a component in the inventive leather cleaner and conditioner, and acts as a wetting and penetrating agent. Lecithin is a well-known mixture of phosphatides, generally derived from degumming soybean oil or obtained from other vegetable seeds. The lecithin may be present at a concentration from about 0.5 to about 3.8 weight percent. Preferably, the concentration of lecithin is about 2 weight percent. A preferred lecithin may be obtained from ADM, Ross & Rowe Division of Decatur, Illinois under the product designation "SOY LECITHIN".

The inventive leather cleaner and conditioner contains poly (5) oxyethylene isodecyl oxypropyl amine as an emulsifier. A preferred poly (5) oxyethylene isodecyl oxypropyl amine is available from Exxon Chemical Americas Specialties/Tomah Products of Milton, Wis. under the product designation "E-14-5". The concentration of poly (5) oxyethylene isodecyl oxypropyl amine ranges from about 8 to about 29 weight percent. Preferably, the concentration is about 15 weight percent.

Sorbitan monolaurate is present in the leather cleaner and conditioner as an emulsifier and stabilizer. It may be present at a concentration ranging from about 0.03 to about 14 weight percent. Preferably, the concentration of sorbitan monolaurate is about 0.9 weight percent.

The inventive leather cleaner and conditioner contains triethanolamine modified dodecylbenzene sulfonate as a detergent. The ,concentration of triethanolamine modified dodecylbenzene sulfonate may range from about 6 to about 18 weight percent. Preferably, the concentration is about 10 weight percent. A preferred triethanolamine modified dodecylbenzene sulfonate may be obtained from Stepan Company of Northfield, Ill. under the product designation "NINATE 411".

Butylated hydroxytoluene is present in the inventive formulation as an antioxidant. The butylated hydroxytoluene may be present at a concentration from about 0.05 to about 0.9 weight percent. Preferably, the concentration is about 0.1 weight percent.

The inventive leather cleaner and conditioner contains mineral oil, a well-known highly refined aliphatic- or aromatic-based colorless, tasteless, and odorless petroleum oil. The mineral oil may be present at a concentration from about 0.5 to about 1.7 weight percent. A preferred mineral oil may be obtained from Lyondell Petrochemical Company of Houston, Tex. under the product designation "DUOPRIME OIL 90".

Water makes up the balance of the inventive leather cleaner and conditioner.

The ingredients of the leather cleaner and conditioner may be blended and mixed together in conventional mixing apparatus. The resultant formulation may then be utilized as a leather cleaner and conditioner by spraying or otherwise conventionally applying same to the surface of the leather to be cleaned and conditioned. Thereafter, the residue is merely wiped off the leather using a clean cloth. Thus, the leather is cleaned and conditioned.

EXAMPLE

The following ingredients are mixed together in the approximate weight percentages indicated, to prepare a leather cleaner and conditioner according to the present invention. Thereafter, the formulation is sprayed onto the surface of a leather article. The residue on the surface of the leather article is wiped off with a clean cloth. Thus, the leather article is cleaned and conditioned.

TABLE 1

LEATHER CLEANER AND CONDITIONER

| Ingredient | Weight Percent |
|---|---|
| d-limonene (1) | 27.8 |
| dipropylene glycol N-butyl ether | 13.5 |
| lecithin (2) | 2 |
| poly (5) oxyethylene isodecyl oxypropyl amine (3) | 15 |
| sorbitan monolaurate | 0.9 |
| triethanolamine modified dodecylbenzene sulfonate (4) | 10 |
| butylated hydroxytoluene | 0.1 |
| mineral oil | 1 |
| water | 29.7 |

(1) GLIDSAFE, from SCM Glidco Organics.
(2) SOY LECITHIN, from ADM, Ross & Rowe Division.
(3) E-14-5, from Exxon Chemical Americas Specialties.
(4) NINATE 411, from Stepan Company.

This Example may be repeated with similar success by substituting the generically or specifically described ingredients and/or concentrations recited herein for those used in the preceding Example.

From the foregoing description, one ordinarily skilled in the art can easily ascertain the essential characteristics of this invention and, without departing form its spirit or scope, can make various changes and modifications to adapt the invention to various uses and conditions.

What is claimed is:

1. A leather cleaner and conditioner composition, consisting of:
   from about 19 to about 60 weight percent d-limonene;
   from about 7 to about 18 weight percent dipropylene glycol N-butyl ether;
   from about 0.5 to about 3.8 weight percent lecithin;
   from about 8 to about 29 weight percent poly (5) oxyethylene isodecyl oxypropyl amine;
   from about 0.03 to about 14 weight percent sorbitan monolaurate;
   from about 6 to about 18 weight percent triethanolamine modified dodecylbenzene sulfonate;
   from about 0.05 to about 0.9 weight percent butylated hydroxytoluene;
   from about 0.5 to about 1.7 weight percent mineral oil; and
   the balance, water.

2. A leather cleaner and conditioner composition, consisting of:
   about 27.8 weight percent d-limonene;
   about 13.5 weight percent diporpylene glycol N-butyl ether;
   about 2 weight percent lecithin;
   about 15 weight percent poly (5) oxyethylene isodecyl oxypropyl amine;
   about 0.9 weight percent sorbitan monolaurate;
   about 10 weight percent triethanolamine modified dodecylbenzene sulfonate;
   about 0.1 weight percent butylated hydroxytoluene;
   about 1 weight percent mineral oil; and the balance, water.

3. A method for cleaning and conditioning leather, comprising applying to a surface of the leather a formulation consisting of:
   from about 19 to about 60 weight percent d-limonene;
   from about 7 to about 18 weight percent diporpylene glycol N-butyl ether;
   from about 0.5 to about 3.8 weight percent lecithin;
   from about 8 to about 29 weight percent poly (5) oxyethylene isodecyl oxypropyl amine;
   from about 0.03 to about 14 weight percent sorbitan monolaurate;
   from about 6 to about 18 weight percent triethanolamine modified dodecylbenzene sulfonate;
   from about 0.05 to about 0.9 weight percent butylated hydroxytolune;
   from about 0.5 to about 1.7 weight percent mineral oil; and
   the balance, water.

4. A method for cleaning and conditioning leather, comprising applying to the surface of a leather a formulation consisting of:
   about 27.8 weight percent d-limonene;
   about 13.5 weight percent diporpylene glycol N-butyl ether;
   about 2 weight percent lecithin;
   about 15 weight percent poly (5) oxyethylene isodecyl oxypropyl amine;
   about 0.9 weight percent sorbitan monolaurate;
   about 10 weight percent triethanolamine modified dodecylbenzene sulfonate;
   about 0.1 weight percent butylated hydroxytoluene;
   about 1 weight percent mineral oil; and
   the balance, water.

* * * * *